April 23, 1968   J. MÜLLER ET AL   3,379,870
LIGHTING FIXTURE FOR ATTACHMENT TO A WALL OF A SICK-ROOM
Filed Sept. 23, 1965   11 Sheets-Sheet 1

INVENTORS
J. MÜLLER & H. RIEGLER
By Lowry & Rinehart
ATTYS.

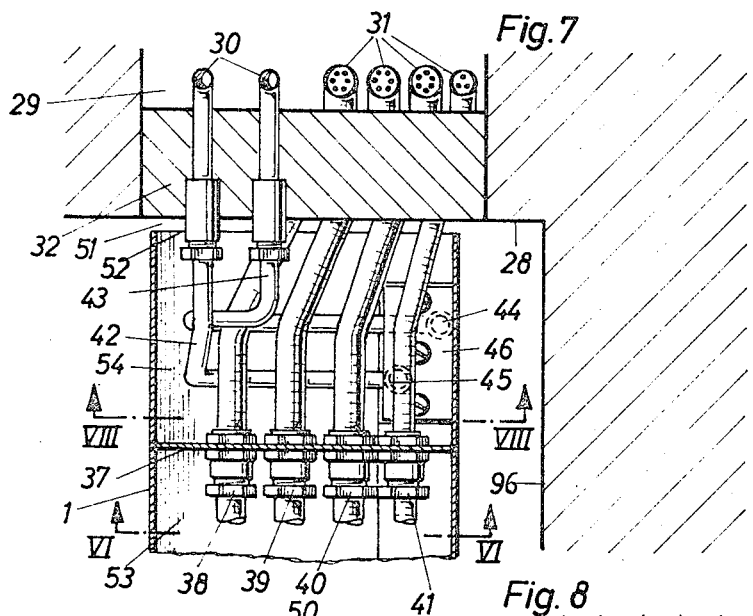

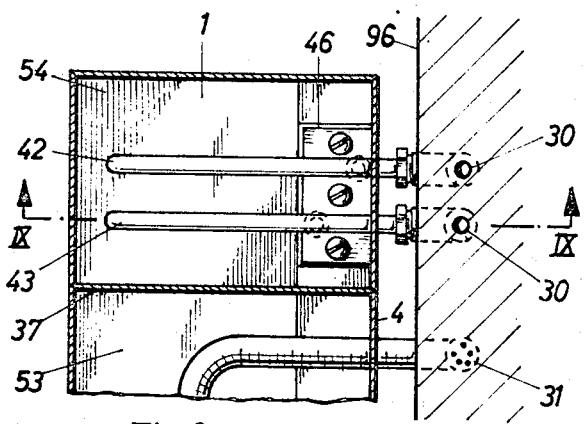
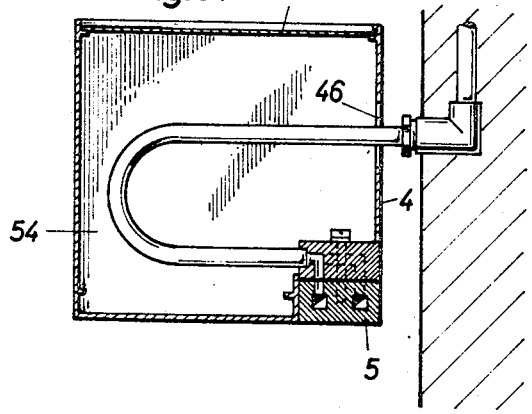

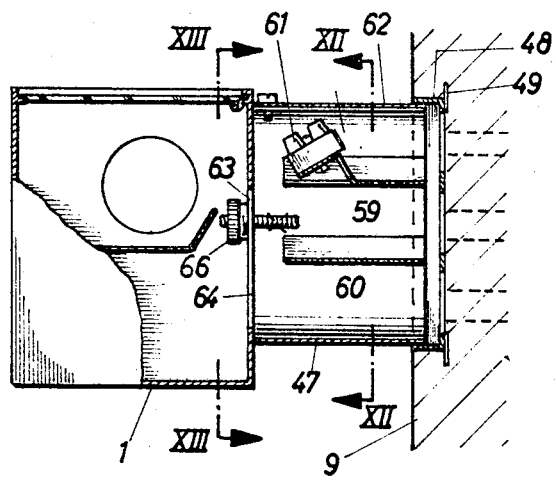
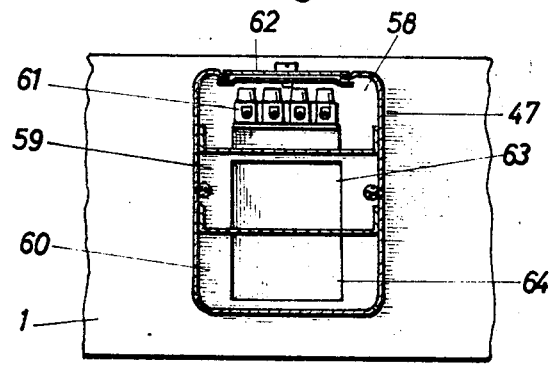
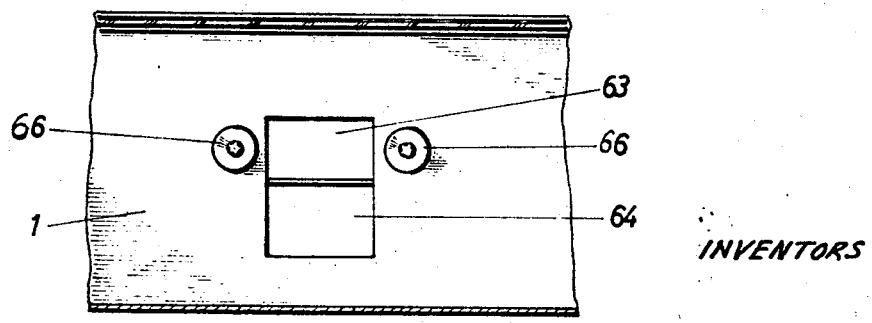

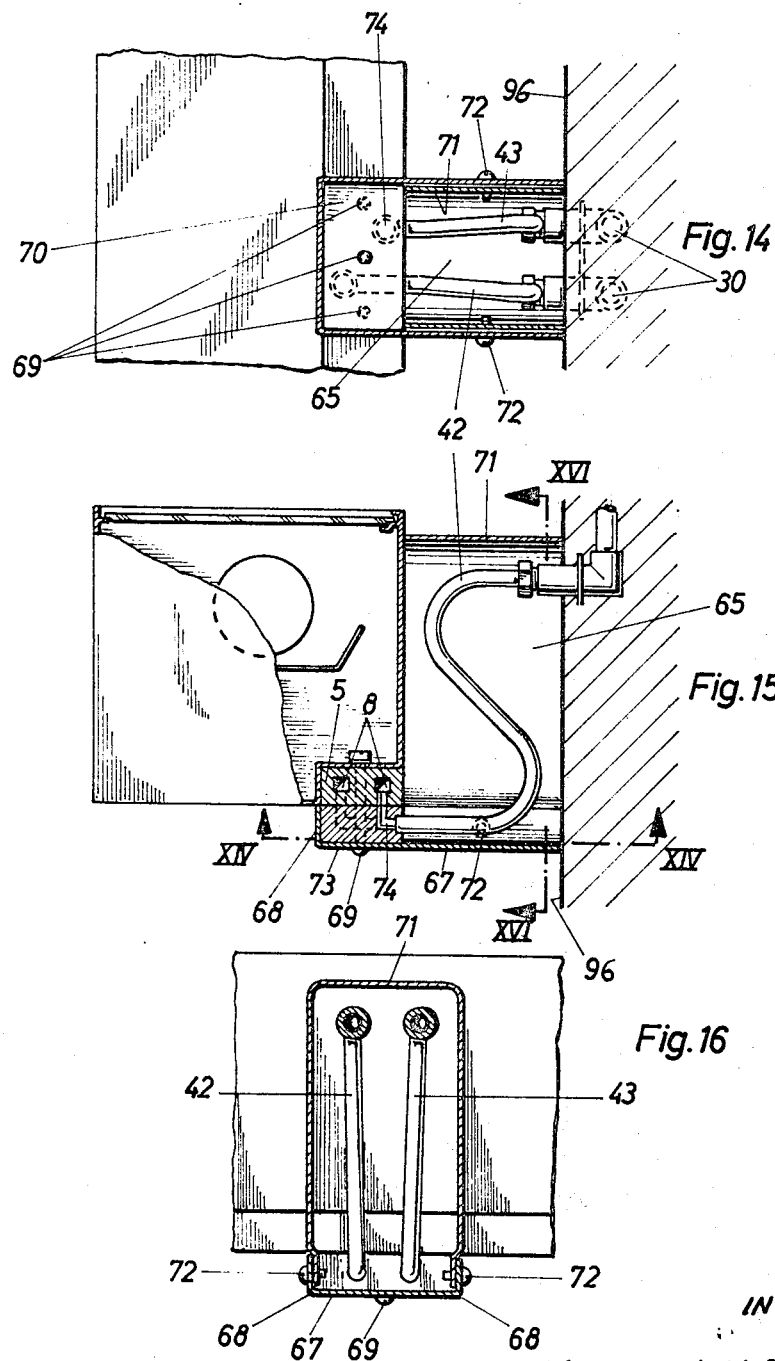

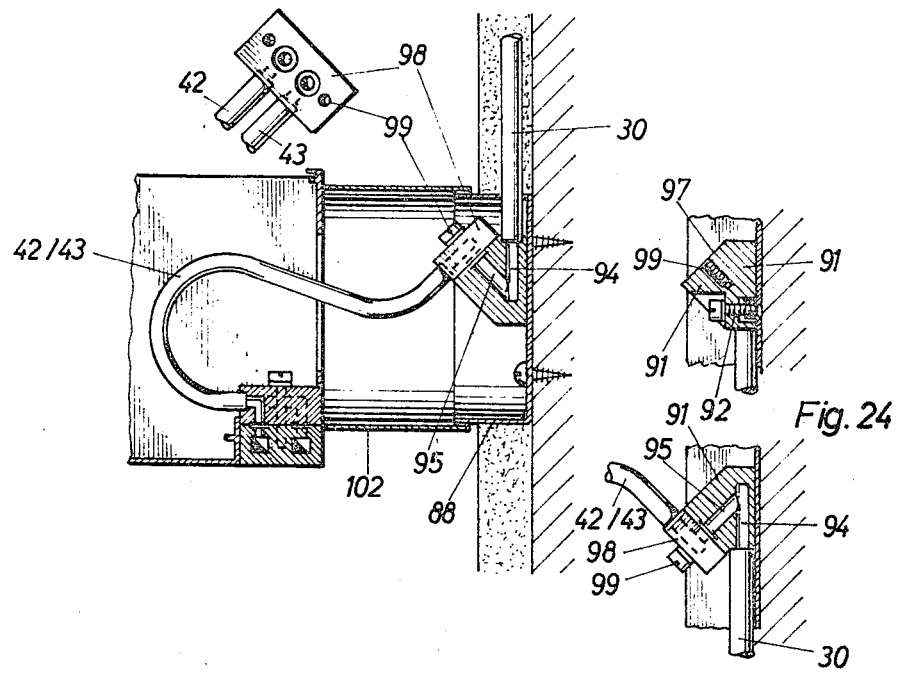
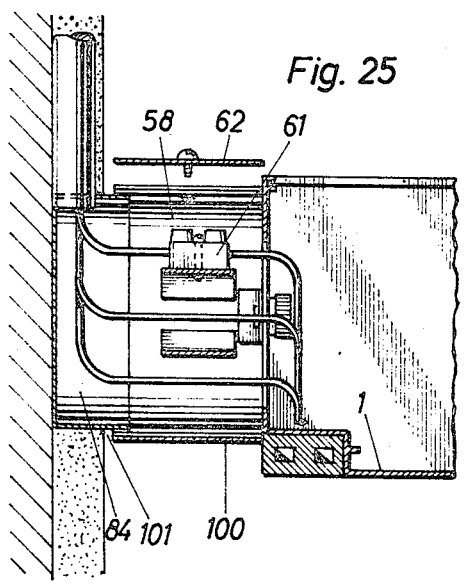

April 23, 1968  J. MÜLLER ET AL  3,379,870
LIGHTING FIXTURE FOR ATTACHMENT TO A WALL OF A SICK-ROOM
Filed Sept. 23, 1965  11 Sheets-Sheet 11
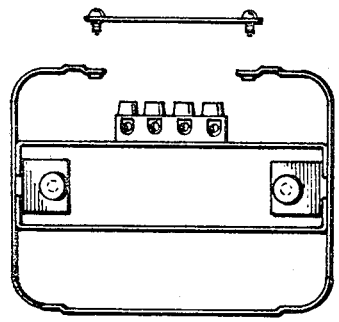
Fig. 28
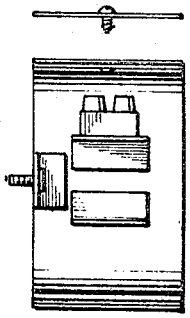
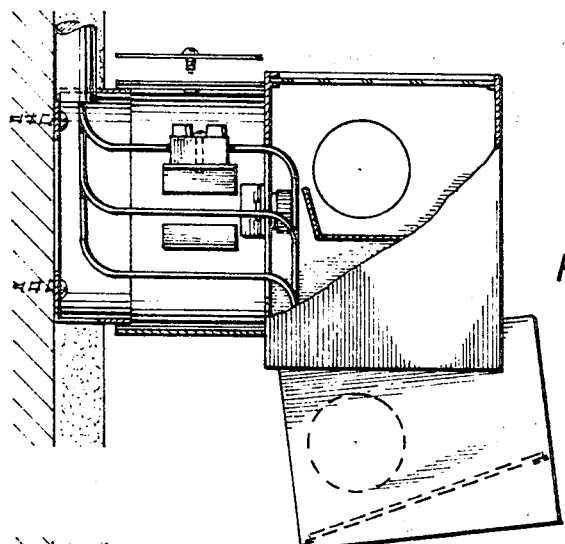
Fig. 29
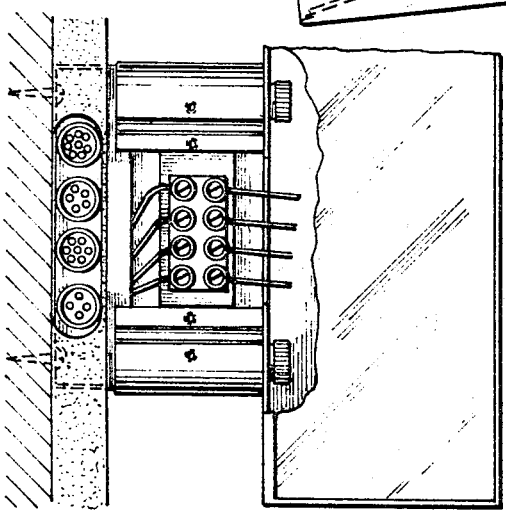
Fig. 30
INVENTORS
J. MÜLLER & H. RIEGLER
BY Lowry & Rinehart
ATTYS.

United States Patent Office 3,379,870
Patented Apr. 23, 1968

3,379,870
LIGHTING FIXTURE FOR ATTACHMENT TO
A WALL OF A SICK-ROOM
Josef Müller and Harald Riegler, Neheim-Husten, Germany, assignors to Trilux-Lenze K.G., Neheim-Husten, Germany
Filed Sept. 23, 1965, Ser. No. 489,602
Claims priority, application Germany, Sept. 23, 1964,
T 27,062; Oct. 8, 1964, T 27,166; Apr. 20, 1965,
T 28,427, T 28,428; May 28, 1965, T 28,676
10 Claims. (Cl. 240—73)

ABSTRACT OF THE DISCLOSURE

A lighting fixture for attachment to a wall of a sick room, containing an elongated U-shaped casing extending over several beds or across the entire width of the room, with a lighting fixture within the U-shaped casing, a continuous longitudinal recess formed in the lower rear edge of the casing externally of the lighting fixture, a longitudinal strip within the recess extending throughout the entire length of the casing, and gas channels positioned within the longitudinal strip so that gas can be introduced into the gas channels at any desired place from connections on the side of the building and gas can be removed from the gas channels at any desired place through supporting members attached beneath the bottom of the casing. The U-shaped casing also contains electrical cables for telephone connections and the like.

---

This invention relates to lighting fixtures, and more specifically to a lighting fixture for attachment to a wall of a sick-room, which is preferably equipped with fluorescent lamps contained in an elongated U-shaped casing extending over several beds. All electrical accessory units and parts of the installation can be fixed on a rack insertable from above into the casing of the lighting fixture. The base of the casing can be provided with openings for sockets, switches and the like.

According to the invention, a lighting fixture for attachment to a wall of a sick-room comprises an elongated U-shaped casing extending over several beds or over the entire width or length of the room, a continuous recess formed in said casing in the longitudinal direction thereof, a strip inserted from outside in said recess, channels in said strip for the connection of gas pipes thereto, a rack supporting electrical parts, and valves and other control means for the channels in the strip arranged in a space above a section free from the rack supporting the electrical parts.

As a further development of the invention, electric cables as well as gas pipes may be connected to the lighting fixture either in the region behind a lighting unit attached to the casing of the lighting fixture or at one end face of the continuous casing.

An important feature of the invention consists in that an antechamber may be formed in the casing of the lighting fixture at one end thereof by a partition separating the antechamber enclosing gas supply pipes and their connections to the channels in the strip from the remaining part of the casing.

Another feature of the invention consists in that box type chambers may be arranged between the casing of the lighting fixture and the wall of the building to which the lighting fixture is to be attached, which chambers may enclose electric cables, gas pipes, connections, fastening bolts or the like.

It is a further feature of the invention to provide a special frame for the passage of the gas pipes out of the wall, which is buried in the plaster of the wall and laterally attachable to a frame for the electrical installation.

The invention is based on the object not only to clearly separate from one another the accessory units and parts of installation, associated with the individual circuits, for the lighting of the room, the lighting of the bed, broadcasting, telephone, medical instruments and the like and their connections to the cables, but also to keep them apart from the gas pipes for compressed air, oxygen and the like and their connections. On the other hand, the casing of the lighting fixture is to receive all supply connections so that additional installations in the room are no longer required. These objects are achieved by the present invention.

Several embodiments of the invention will now be described by way of example and with reference to the accompanying drawings, in which:

FIG. 6 is a section through the casing of the lighting fixture taken on the line VI—VI of FIG. 7;

FIG. 7 is a horizontal section through the casing of the lighting fixture and the adjoining walls of the building in the region of the point of connection;

FIG. 8 is a section taken on the line VIII—VIII of FIG. 7;

FIG. 9 is a section taken on the line IX—IX of FIG. 10;

FIG. 10 is a horizontal section through the arrangement of FIG. 9;

FIG. 11 is a vertical section through a chamber having two intermediate bottoms, particularly for electrical leads;

FIG. 12 is a vertical section through the chamber of FIG. 11 taken on the line XII—XII of FIG. 11;

FIG. 13 is a section taken on the line XIII—XIII of FIG. 11;

FIG. 14 is a horizontal section through a chamber for the gas supply taken on the line XIV—XIV of FIG. 15;

FIG. 15 is a vertical section through the arrangement of FIG. 14;

FIG. 16 is a section through the chamber of FIG. 15 taken on the line XVI—XVI of FIG. 15;

FIG. 23 is a section taken on the line XXIII—XXIII of FIG. 22;

FIG. 24 is a section taken on the line XXIV—XXIV of FIG. 21;

FIG. 25 is a section taken on the line XXV—XXV of FIG. 22;

FIGS. 28 to 30 illustrate the use of the invention without gas installation.

Figure 1:
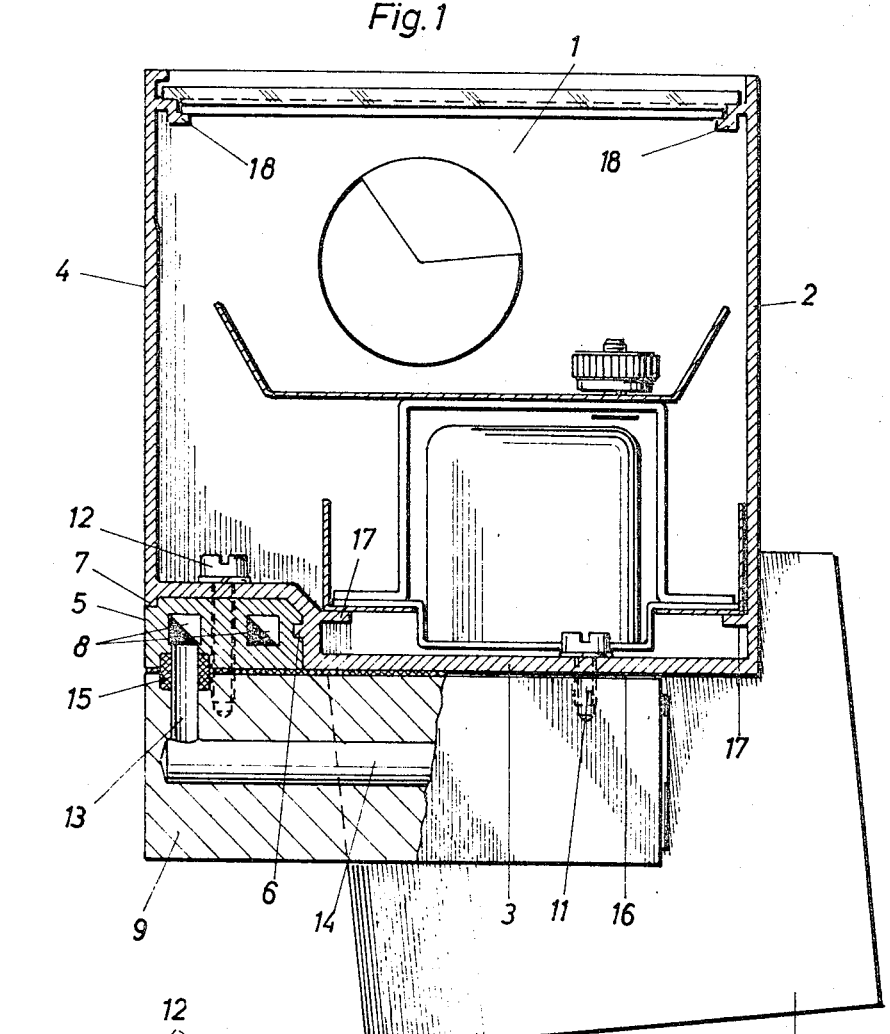
FIG. 1 is a section through the casing of a lighting fixture according to the invention.
Figure 2:
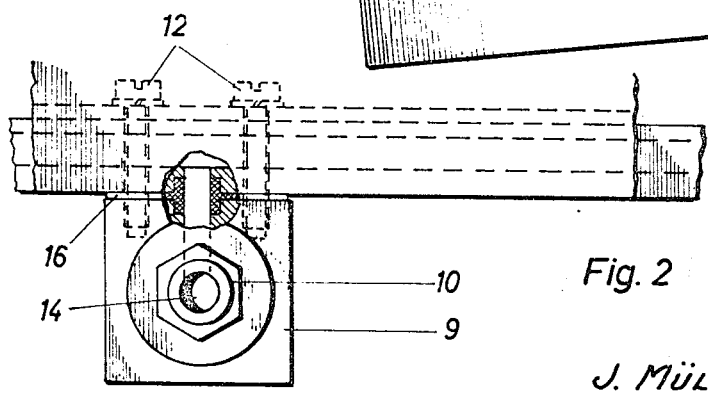
FIG. 2 is a front view of the supporting member with tap connections.

In the embodiment shown in FIGS. 1 and 2 a lighting fixture according to the invention has a casing 1 of U-shaped cross section. A front side 2 of the casing extends at right angles upwardly from a base 3. The rear lower edge of the casing defines a recess so that the rear side 4 of the casing and the base 3 do not extend to the edge of the U shape. In this recess a strip 5 is inserted which is held in the recess by a horizontal rib 6 and a vertical rib 7. The strip 5 has two channels 8 of square cross section for the passage therethrough of gas.

The base 3 of the casing of the lighting fixture has spaced-apart supporting members 9 fixed thereto which are provided with connections 10 for gas tubes or the like. Fixing of the supporting members 9 to the base 3 is effected by means of fastening screws 11 and 12 from the interior of the casing of the lighting fixture, with the rear bolts 12 passing through the strip 5 and thereby securing same in position. The rear channel 8 in the strip 5 for the passage of gas communicates through a bore 13 with a bore 14 in the supporting member 9 leading to the connection 10. The point where the bore 13 passes from the strip 5 into the supporting member 9 is sealed by a stuffing box type packing 15. Interposed between the supporting member 9 and the base 3 of the casing 1 of the lighting fixture is an electrolytic separating plate 16.

The front and rear sides 2 and 4 of the casing 1 of the lighting fixture are provided on their inner faces with ribs 17 for supporting the rack for the electrical equipment and flanges 18 for supporting a light-transmissive cover.

Figure 3:
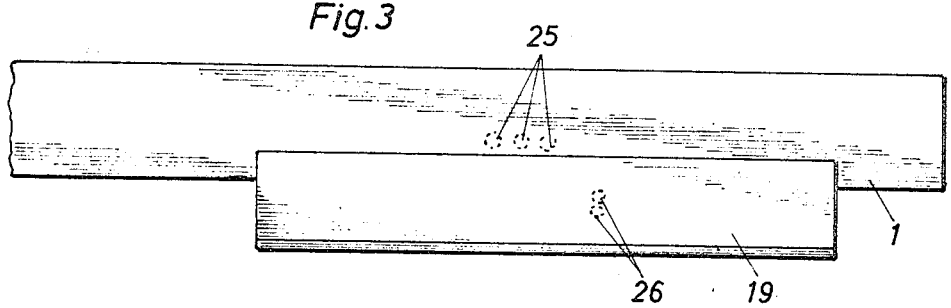
FIG. 3 is a fragmentary front view of another embodiment of the lighting fixture.

In FIG. 3 the continuous casing 1 of the lighting fixture provided for the general lighting of a sick-room and extending in general over the entire length or width of the room is not shown in its full length. To the casing 1 there is attached a special casing 19 of a lighting unit for lighting a bed positioned thereunder.

Figure 4:
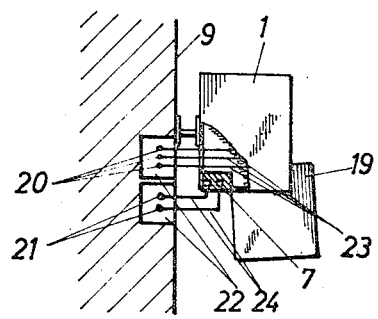
FIG. 4 is a section through the arrangement of FIG. 3.

FIG. 4 shows the arrangement of electric cables and gas pipes in a wall. Below cables 20 for weak current, mains current and telephone there are arranged gas pipes 21. The cables and gas pipes are laid in that wall to which the lighting fixture is attached.

The cables 20 and the gas pipes 21 lead into connection boxes 22 provided in the wall. From these connection boxes 22 electrical leads 23 for weak current, mains current and telephone lead straight into the casing 1 of the lighting fixture where they are connected to the existing terminals and supply pipes 24 for gas lead to the bottom side of the casing 1 where the strip 5 having the continuous channels 8 is arranged and where they are connected with the aid of the necessary fittings.

It is evident from FIG. 3 that the openings 25 for the electrical leads 23 as well as the connections for the gas supply pipes 24 referenced 26 are located each time in the region behind a casing 19 of a lighting unit for lighting a bed. By this measure the connection is facilitated in respect of installation technique. In particular, the electrical and mechanical fittings required for the connection are covered by the casing 19 lying in front thereof.

Figure 5:
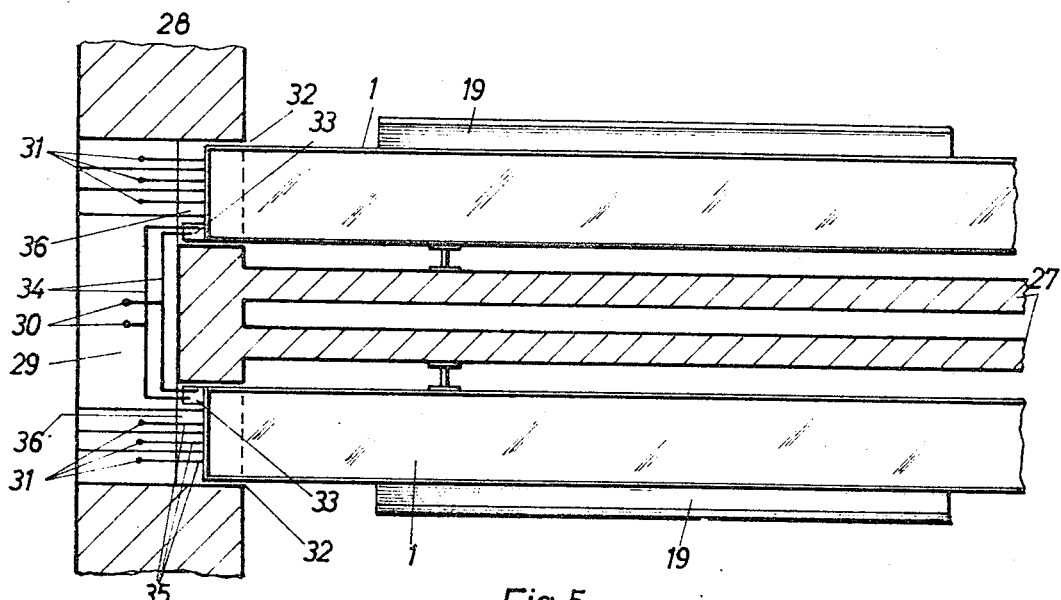
FIG. 5 is a horizontal longitudinal section through a further embodiment, illustrating the connection of the cables and gas pipes to one end face of the lighting fixture.

FIG. 5 shows another possibility of connecting electrical leads and gas supply pipes to the lighting fixture. As shown in this figure, a wall 27 separates two sick-rooms from one another. To each side of this wall one continuous casing 1 of a lighting fixture for the general lighting of the room is attached together with the necessary number of casings 19 of lighting units for lighting beds, only one of the latter casings being shown on each side.

In a partition 28 which separates the two sick-rooms from a corridor, a vertical shaft or manhole 29 is provided which contains vertical rising gas pipes 30 and vertical rising mains 31 for the electical connections. The shaft 29 has one opening 32 for each sick-room. Through each opening 32 one lighting fixture projects with the end face of the continuous casing 1. In this manner it is possible to establish both the connections for gas from the rising gas pipes 30 to the lighting fixtures and the connections for electricity from the rising mains 31 to the lighting fixtures over the shortest distance. In particular, this dispenses with the otherwise necessary operations for burying the electrical leads and gas supply pipes beneath the surface of the plaster. This is particularly important inasmuch as such operations performed on the hollow wall 27 would cause a weakening of the wall.

For the gas supply from the rising gas pipes 30 to fittings 33 on the lighting fixtures, provision is made of gas supply pipes 34 leading to each lighting fixture. Analogously, electrical leads 35 lead from the rising mains 31 to the end face of the casing 1 of each lighting fixture. Partitions are provided in the shaft 29 for separating the individual electrical leads from one another. The opening 32 has an extension 36 leading to the shaft 29.

FIG. 6 shows the cross-sectional form of a casing 1 of a lighting fixture having a light-transmissive top 50, a space 53 for the reception of the connections and of the rack for the electrical equipment and the recess along the right lower edge, which serves to receive the strip 5 with the gas conduits.

As shown in horizontal section in FIG. 7, the casing 1 of the lighting fixture is attached to a wall 96 of a building, whereas the partition 28 has the vertical shaft 29 extending therethrough. The shaft 29 contains the mains 31 and the two gas pipes 30, e.g. for compressed air and oxygen. The shaft 29 communicates with the room through an opening 32 in the partition 28.

Near its end adjacent the shaft 29 the casing 1 of the lighting fixture is divided by a partition 37. The partition 37 tightly seals the entire inner space 53 over the whole cross-sectional area thereof, as can be seen from FIGS. 6 and 8, with the cross-sectional form of the casing including the strip 5 having the gas conduits being retained. For welding the edge of the partition 37 to the continuous casing 1 of the lighting fixture, the so-called three-plate welding process may be applied.

The partition 37 divides the interior of the casing into the inner space 53 for the electrical equipment and a so-called antechamber 54. The rack with the electrical equipment and the connections is located in the space 53 on this side of the partition 37 and on the other side of the partition 37 there is arranged the so-called antechamber 54 which extends just to or short of the partition 28 from which it is spaced only by a small distance 51 and to which it is open at 52.

Through this open side 52 all conduits, i.e. the mains 31 as well as the gas pipes 30, can be introduced from the shaft 29 into the casing 1. The mains are passed through the antechamber 54 without connection. They pass through the intermediary of stuffing boxes 38, 39, 40 and 41 through the partition 37 into the space 53 where they are connected to the rack for the electrical equipment. Thus no electrical connecting piece is present in the antechamber 54.

The antechamber 54 merely serves for the connection of the gas pipes. As can be seen from FIG. 7, supply pipes 42 and 43 pass into the antechamber 54 where they are bent to extend in transverse direction and connected at 44 and 45 to the gas conduits in the strip 5. The connections are effected with the known equipment suitable for such purpose. To provide access to the strip 5, the wall of the casing has an opening 46 near the point where the connection is made.

In the embodiment of the casing of the lighting fixture shown in FIGS. 9 and 10 the gas pipes 30 and the cables 31 are introduced at the rear side 4 of the casing 1. The partition 37 separates the antechamber 54 from the remaining space 53 of the casing. The strip 5 with the gas conduits is fixed externally of the casing 1. The gas gas pipes 30 project from the wall 96 at a point behind the antechamber 54 and are connected by the supply pipes 42 and 43 to the gas conduits in the strip 5, which are accessible through the opening 46 in the wall of the antechamber.

The cables 31 are introduced directly into the space 53 of the casing 1 of the lighting fixture and connected to the electrical equipment supported by the rack not shown.

Figure 17:
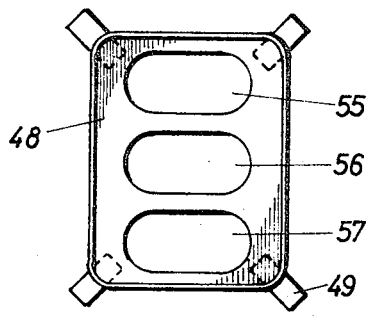
FIG. 17 is an elevational view of a frame insertable in the wall of the building so as to be flush with the plaster.

FIGS. 11 to 13 are various sections illustrating the construction of a chamber 47 for electrical connections. A frame 48 shown in more detail in FIG. 17 is provided for use in connection with this chamber 47. This frame 48 is buried in the plaster coating the wall to which the lighting fixture is attached. For this purpose, anchoring means 49 are provided. The frame 48 has openings, 55, 56 and 57 lying one above the other, through which the cables for telephone, weak current (for light signalling and the like) as well as for the mains current pass out separate from one another.

The chamber 47 is slidably inserted in the surrounding frame 48. On the opposite side the chamber 47 is fixed to the casing of the lighting fixture by means of nuts 66. To include the casing of the lighting fixture in the protective measures, the nuts 66 are so designed that they establish an electrically conducting connection between the casing 1 and the chamber 47.

The chamber 47 is divided from the top to the bottom into three compartments 58, 59 and 60. The uppermost compartment 58 is separated from the compartment 59 and serves for the telephone connection. In this compartment 58 a connecting terminal 61 for the telephone connection, which has already been wired in the factory, is screwed on. The compartment 58 for the telephone connection is accessible through an unscrewable cover 52. Personnel transferring a telephone thus need merely make the uppermost compartment 58 accessible to them. In this compartment are telephone lines only. This clear separation facilitates the work of the postal personnel in view of the fact that this personnel has specialized in this work only.

The compartments 59 and 60 lying thereunder communicate with the interior of the casing 1 of the lighting fixture through openings 63 and 64. These openings 63 and 64 serve to extend the cables for weak current and mains current to the casing 1.

FIGS. 14 to 16 show a chamber 65 as used for the gas supply pipes. These figures are different sectional views of the chamber 65. The chamber 65 which covers the gas supply pipes 42 and 43 between the wall 96 and the casing of the lighting fixture is constructed in two parts. A lower part 67 of the chamber has three upright walls 68. It is fixed to a gas connecting part 70 by means of bolts 69. A U-shaped upper part 71 of the chamber is connected to the lower part 67 of the chamber by means of screws 72. At the bottom the chamber 65 has a projecting part 73 which covers the point 74 where the two gas supply pipes 42 and 43 are connected to the gas connecting part 70. The gas supply pipes 42 and 43 extend in S shape from a fixed connection on the wall 96. In this form they are flexible enough to permit the point of connection 74 on the casing of the lighting fixture and thus the entire casing of the lighting fixture to be shifted upwardly or laterally as desired. In this manner the mechanic is given a free hand with respect to the place where the lighting fixture is to be mounted.

Figure 18:
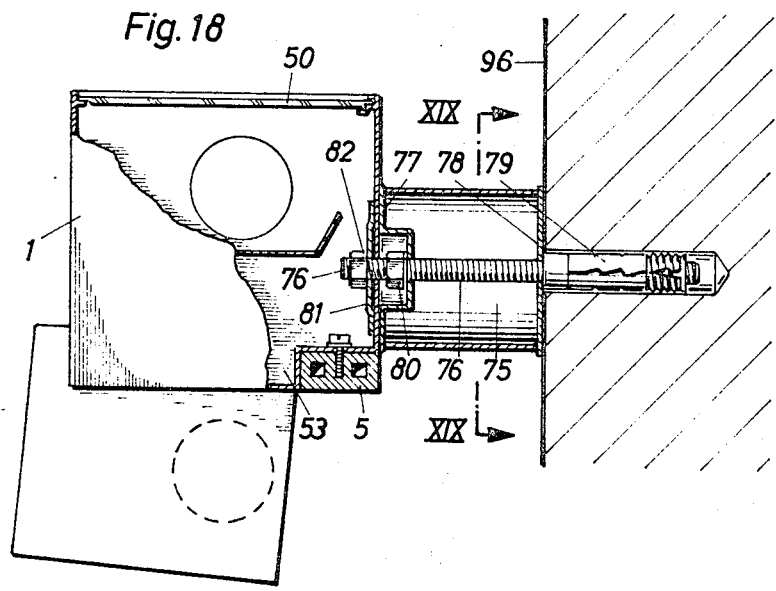
FIG. 18 is a section through a chamber with two plates and a fastening bolt extending therethrough.

FIG. 18 particularly shows the cross-sectional form of the casing 1 of the lighting fixture. Reference numeral 50 designates the light-transmissive top, reference numeral 53 the inner space for the rack supporting the electrical equipment and reference numeral 5 the strip with the gas conduits.

Figure 19:
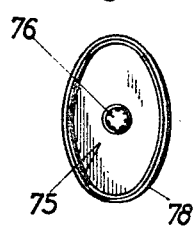
FIG. 19 is a section through the chamber of FIG. 18 taken on the line XIX—XIX of FIG. 18.

A chamber 75 encloses a fastening bolt 76. As can be seen from FIG. 19, the chamber is oval-shaped. It is arranged at such a level that it covers the rear wall of the casing over a large part of the height thereof by a plate 77 adjacent the casing. On the opposite side the chamber 75 engages the wall 96 by a plate 78. The particular arrangement of the chamber 75 at the specified level ensures a good and stable engagement of the chamber with the wall 96. The distance between the rear side of the casing and the wall 96 should amount to about 60 mm. The fastening bolt 76 extends through the chamber 75 and is securely held in the wall 96 by means of a wall dowel 79. A retaining nut 80 is screwed to the fastening bolt 76 and secures the chamber 75 to the wall. The retaining nut 80 is located in its tightened position in a recess in the plate 77 so that it does not project from the plate. The casing of the lighting fixture is fitted with its rear side on the fastening bolt and secured thereon by means of a nut 82 also screwed to the fastening bolt 76, through the intermediary of one or several washers 81.

Figure 20:
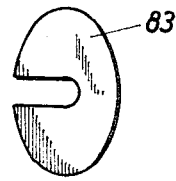
FIG. 20 is an elevational view of a slotted shim.

Slotted shims 83 as shown in FIG. 20 are provided to compensate irregularities of the wall of the building.

Figure 21:
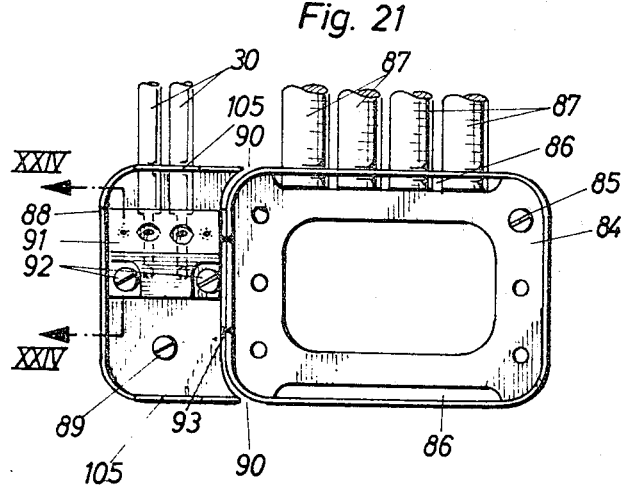
FIG. 21 is an elevational view of a frame for the electrical installation with the attached frame for the gas installation, both intended to be buried in the plaster.

In the embodiment shown in FIG. 21 and the following ones a buried frame 84 for the electrical installation is placed with its rear side on a carcass wall and fixed thereto by means of screws 85. In the top and bottom side walls of the frame 84 there are provided openings 86 for the passage therethrough of cables 87 which can thus be introduced into the frame from above or below depending on local conditions. The right one of the four cables 87 is the line for the telephone connection.

Figure 22:
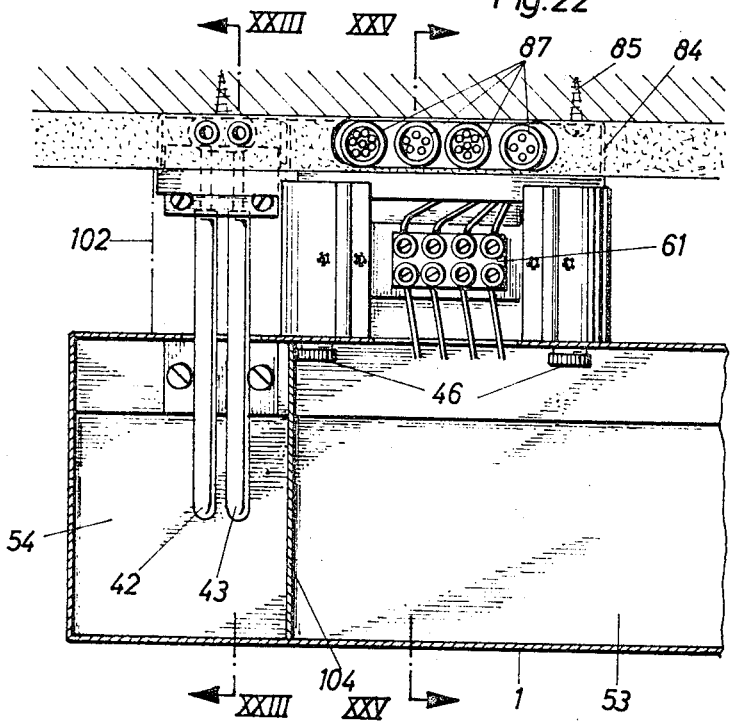
FIG. 22 is a horizontal section through the two frames, through the casing of the lighting fixture and the parts lying therebetween.

It can be seen from FIGS. 22 and 23 that the side walls of the frame 84 are not flush with the surface of the plaster coating the carcass wall, but slightly project from the surface of the plaster. In view of this measure the thickness of the plaster need not be chosen so as to correspond to the height of the side walls of the frame, but this is left to one's own discretion. The thickness of the plaster is chosen to be such that the cables 87 can also be laid on the carcass wall and are coated by the plaster.

To the left-hand side of the buried frame 84 for the electrical installation there is attached a buried frame 88 for the gas installation. This frame is again placed with its rear side on the carcass wall and fixed thereon by means of one or several screws 89. The gas pipes 30 which are also buried beneath the surface of the plaster pass through openings in the side walls of the frame 88 into the interior of the frame 88 where they are received by a gas connection 91.

The gas connection 91 is fixed in the frame 88 by means of screws 92. On the side where the frame 88 is connected to the frame 84 for the electrical installation the frame 88 is open as indicated by reference numeral 90. On this side the two frames are connected together by spot welds 93. The buried frame 88 for the gas installation, like the buried frame 84 for the electrical installation, slightly projects with its side walls from the surface of the plaster.

The construction of the gas connection 91 can be seen from FIGS. 23 and 24. In the buried frame 88 the gas connection 91 is fixed with the aid of the screws 92. The gas connection 91 may be so dimensioned as to receive any desired number of gas pipes 30. In the present case two gas pipes 30 are provided. Each gas pipe 30 has an upwardly extending passage 94 associated therewith which is intended for the connection to the gas pipe 30 extending along the wall and to the supply pipe 42 or 43 through an obliquely directed passage 95 extending at an acute angle relative to the passage 94.

The two passages 95 open into an oblique surface 97. On this surface 97 a connection plate 98 is fastened with screw 99. From this connection plate 98 the supply pipes 42 and 43 extend to the lighting fixture. Screwing the connection plate 98 to the oblique surface 97 in conjunction with an interposed packing ensures a tight seal.

Expediently the connection 91 is soldered to the gas pipes 30 already in the factory. Depending on local conditions the connection 91 can be fixed in the frame 88 in such a manner that the gas pipes 30 are directed either upwardly or downwardly. Accordingly, also the oblique surface 97 is directed either upwardly or downwardly as shown in FIG. 24. This ensures a good adaptation to local conditions.

A box type chamber 100 serves to cover or receive the conductors between the casing 1 of the lighting fixture and the buried frame 84. The chamber 100 is fitted on the projecting side walls of the frame 84. The side walls of the frame 84 project from the surface of the plaster to such an extent that tolerances can be compensated. FIG. 25 shows a clearance 101 between the plaster and the edge of the box type chamber 100.

The box type chamber is subdivided by several intermediate bottoms. The uppermost part of the chamber is rendered accessible by a cover 62 and intended for the telephone connection. The connecting terminal required for this purpose is designated by reference numeral 61 and the part of the chamber containing it by reference numeral 58.

Figure 26:
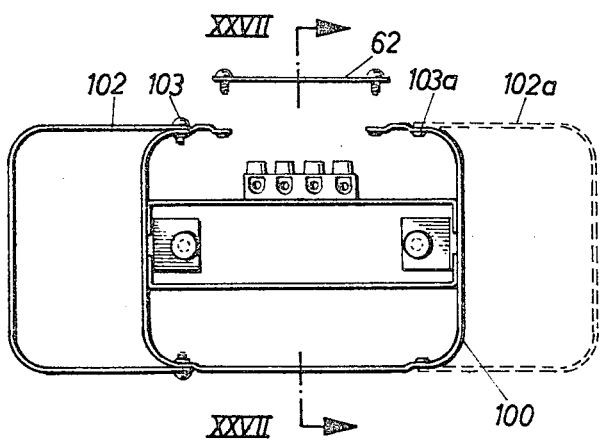
FIG. 26 is a section through the chamber of FIGS. 21 and 22.
Figure 27:
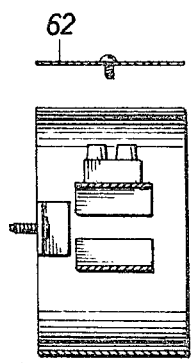
FIG. 27 is a section taken on the line XXVII—XXVII of FIG. 26.

In case of need, provision may also be made of a box type chamber 102 for covering the gas pipes between the buried frame 88 and the casing 1 of the lighting fixture. This chamber is bent into U shape as shown in FIG. 26 and fastened at its edges with the aid of screws 103 to one side wall of the box type chamber 100 for the electrical installation. Depending on local conditions the chamber 102 to be attached can be connected to the one or the other side of the chamber 100. This possibility is shown in FIG. 26 where reference numeral 102a designates a chamber as fastened with screws 103a to the opposite side wall of the chamber 100. The chamber 102 is again fitted on the projecting edge of the buried frame 88 for the gas installation.

In FIG. 22 a partition 104 provided in the casing 1 of the lighting fixture adjacent one end thereof separates in a gastight manner a space intended solely for the gas supply from an inner space of the casing with the electrical equipment so as to prevent the gas connection from being located in the region of electrical connections.

Due to the fact that, as proposed by the present invention, the side walls of the buried frames project from the surface of the plaster, the thickness of the plaster can be chosen as desired and the cables laid on the carcass wall. By the use of an attached buried frame and an attached box type chamber for the gas installation the entire installation equipment can be combined and consequently simplified. In particular, the use of the attached frame ensures that the connections on the wall are already properly positioned relative to the points of connection on the casing of the lighting fixture.

The buried frames and box type chambers can be combined as desired, depending on whether a gas installation is desired or not. The system permits an attachment on the right side and on the left side. The cables and pipes on the wall may extend to the frames from above or from below.

A great part of the cables and pipes can be connected to the respective connecting pieces already in the factory whereby the installational work is likewise facilitated. For example, it is possible to connect the gas connecting piece 91 to the pipes 30 already in the factory. During the installation the pipes 30 are pushed from the interior of the buried frame 88 through the openings in the top and bottom side walls of the frame whereupon the connecting piece 91 is screwed to the frame. As can be seen from FIG. 21, the screws 92 are positioned approximately on the center line so that the connecting piece 91 can also be fastened in such a manner that the passages 94 and 95 with the pipes 30 are downwardly directed.

FIGS. 28 to 30 illustrate the arrangement and use of the above-described parts in a lighting fixture that contains no gas pipes and therefore requires no gas installation. In this case the attached parts pertaining to the gas installation are dispensed with. The electrical parts used for the combined installation can be used also in this case without change and without additions.

FIG. 21 shows openings 105 in the frame 88 for the passage of the pipes 30 therethrough. The openings 86 are formed also in part of the rear wall of the frame 84.

We claim:

1. In a lighting fixture for attachment to a wall of a sick room and containing an elongated U-shaped casing having upwardly extending sides and an open top, said open top constituting means for emitting light rays upwardly toward the ceiling of said sick room and extending over several beds or across the entire width of the room, and a lighting fixture within the U-shaped casing, the improvement comprising a continuous longitudinal recess formed in the lower rear edge of said casing externally of said lighting fixture therein, a longitudinal strip within said recess extending throughout the entire length of said casing, and gas channels in said longitudinal strip, said longitudinal strip being so positioned that gas can be introduced into said gas channels at any desired place from connections on the side of the building and gas can be removed from said gas channels at any desired place through supporting members attached beneath the bottom of the casing.

2. A lighting fixture as defined in claim 1 wherein said gas channels are parallel to each other and further comprising fastening screws in said strip between said gas channels.

3. A lighting fixture as defined in claim 1 and further comprising an antechamber separated from the electrical portions of the casing by a partition, said longitudinal strip extending over said antechamber so that gas pipes can be connected either from the end face or from the longitudinal side thereof.

4. A lighting fixture as defined in claim 1 wherein said casing is spaced from said wall by spacing chambers and continuous fastening bolts, and further comprising gas pipes extending through said wall and connected to said longitudinal strip through S-shaped curved portions of said gas pipes.

5. A lighting fixture as defined in claim 4 wherein said S-shaped gas connection pipes are covered by covering sheets.

6. A lighting fixture as defined in claim 1 wherein electric cables are passed from the longitudinal wall of the building to the rear side of the lighting fixture through box-type chambers, said chambers being subdivided into compartments for different kinds of electrical cables, the uppermost compartment containing a telephone cable, and further comprising a removable cover attached to said uppermost compartment for access to said cable.

7. A lighting fixture as defined in claim 6 and further comprising laterally attachable chambers for separate introduction of the gas pipes beside the electric cables.

8. A lighting fixture as defined in claim 6 and further comprising buried frames for the box type chambers for the electrical connections and gas connections where they emerge from said wall.

9. A lighting fixture as defined in claim 8 and further comprising a gas connection piece having an oblique surface on the buried frame for the bas connection.

10. A lighting fixture as defined in claim 9 and further comprising a first partition between the buried frame for the electrical installation and the buried frame for the gas installation, and a second partition separating the electrical part of the casing from the gas installation, and said first partition being positioned approximately adjacent to said second partition.

References Cited

UNITED STATES PATENTS

| | | | |
|---|---|---|---|
| 3,084,247 | 4/1963 | Bobrick | 240—73 X |
| 3,135,469 | 6/1964 | Hanson | 240—2 |
| 3,200,244 | 8/1965 | Meyer | 240—73 |

NORTON ANSHER, *Primary Examiner.*

R. M. SHEER, *Assistant Examiner.*